US010678548B2

(12) United States Patent
Kenney et al.

(10) Patent No.: US 10,678,548 B2
(45) Date of Patent: Jun. 9, 2020

(54) PIPELINED ALLOCATION FOR OPERAND CACHE

(71) Applicant: Apple Inc., Cupertino, CA (US)

(72) Inventors: Robert D. Kenney, Austin, TX (US);
Terence M. Potter, Austin, TX (US);
Andrew M. Havlir, Orlando, FL (US);
Sivayya V. Ayinala, Austin, TX (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/112,614

(22) Filed: Aug. 24, 2018

(65) Prior Publication Data

US 2020/0065104 A1 Feb. 27, 2020

(51) Int. Cl.
*G06F 9/30* (2018.01)
*G06F 9/52* (2006.01)
*G06F 9/38* (2018.01)

(52) U.S. Cl.
CPC ........ *G06F 9/3802* (2013.01); *G06F 9/30101* (2013.01)

(58) Field of Classification Search
None
See application file for complete search history.

(56) References Cited

U.S. PATENT DOCUMENTS

| | | | |
|---|---|---|---|
| 10,394,716 B1* | 8/2019 | Piry | G06F 12/0808 |
| 2004/0189650 A1* | 9/2004 | Deering | G06T 15/005 |
| | | | 345/506 |
| 2004/0230745 A1* | 11/2004 | Navarro | G06F 12/0851 |
| | | | 711/127 |
| 2007/0169179 A1* | 7/2007 | Narad | H04L 45/16 |
| | | | 726/4 |
| 2009/0327641 A1* | 12/2009 | Piazza | G06F 9/5016 |
| | | | 711/170 |
| 2010/0333098 A1* | 12/2010 | Jordan | G06F 9/384 |
| | | | 718/103 |

(Continued)

OTHER PUBLICATIONS

Yash Ukidave, "Architectural and Runtime Enhancements for Dynamically Controlled Multi-Level Concurrency on GPUs," Dissertation, The Department of Electrical and Computer Engineering partial fulfillment of the requirements for the degree of Doctor of Philosophy in Computer Engineering Northeastern University Boston, Massachusetts, Dec. 2015, 160 pages.

*Primary Examiner* — Hyun Nam
(74) *Attorney, Agent, or Firm* — Kowert, Hood, Munyon, Rankin & Goetzel, P.C.

(57) ABSTRACT

Techniques are disclosed relating to controlling an operand cache in a pipelined fashion. An operand cache may cache operands fetched from the register file or generated by previous instructions to improve performance and/or reduce power consumption. In some embodiments, instructions are pipelined and separate tag information is maintained to indicate allocation of an operand cache entry and ownership of the operand cache entry. In some embodiments, this may allow an operand to remain in the operand cache (and potentially be retrieved or modified) during an interval between allocation of the entry for another operand and ownership of the entry by the other operand. This may improve operand cache efficiency by allowing the entry to be used while to retrieving the other operand from the register file, for example.

20 Claims, 8 Drawing Sheets

(56) References Cited

U.S. PATENT DOCUMENTS

| | | | |
|---|---|---|---|
| 2013/0247060 A1* | 9/2013 | Makljenovic | G06F 9/526 |
| | | | 718/104 |
| 2014/0149718 A1* | 5/2014 | Hughes | G06F 9/30036 |
| | | | 712/208 |
| 2015/0378734 A1 | 12/2015 | Hansen et al. | |
| 2017/0024632 A1* | 1/2017 | Johnson | G06F 3/0604 |
| 2017/0075810 A1 | 3/2017 | Havlir et al. | |
| 2018/0088945 A1 | 3/2018 | Plotnikov et al. | |

* cited by examiner

| Valid 410 | Thread state 415 | Allocation tag 420 | Hint 425 | Cycles 430 |
|---|---|---|---|---|

| Ownership tag 440 |
|---|

| Last Use 450 |
|---|

Control information for operand cache entry 400

FIG. 4

PIPELINED ALLOCATION FOR OPERAND CACHE

BACKGROUND

Technical Field

This disclosure relates generally to computer processors and more specifically to low-level caches for operand storage.

Description of the Related Art

Graphics processing units (GPUs) are frequently used to operate on large amounts of data to generate frames of image data for display. The execution of GPU instructions may consume considerable power. GPUs are typically designed to allow a large amount of parallel execution. High power consumption may be problematic, particularly in mobile graphics applications in which a battery is used as a power source.

Graphics operands are often used multiple times in close succession. Using an operand cache between a register file and execution circuitry may reduce power consumption in accessing such operands, e.g., by avoiding multiple accesses to the register file. Efficient management of operand cache entries may reduce power consumption and improve performance.

BRIEF DESCRIPTION OF THE DRAWINGS

FIG. 4 is a diagram illustrating exemplary control information maintained for an operand cache entry, according to some embodiments.

Figure 1A:
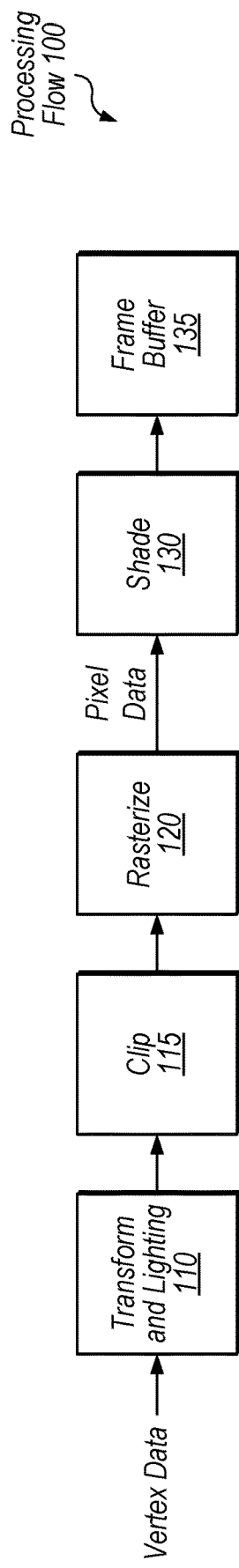
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "operand cache configured to store operands" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
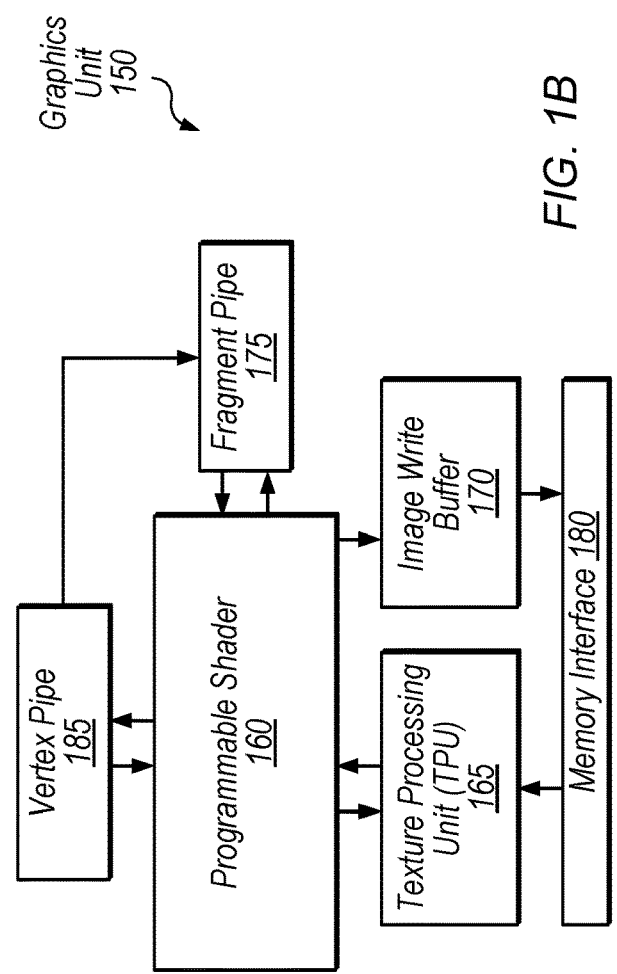
FIG. 1B is a block diagram illustrating one embodiment of a graphics unit.
Figure 2B:
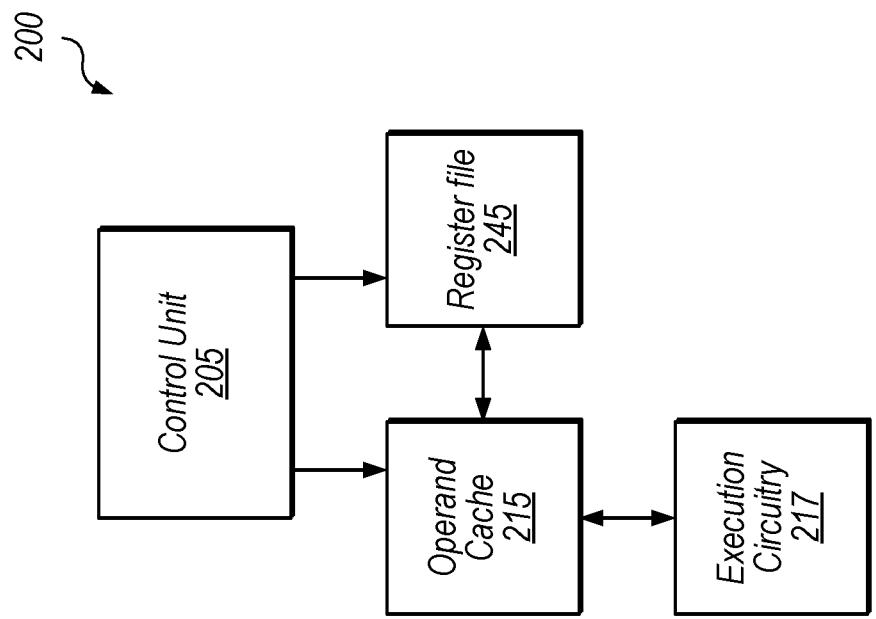
FIG. 2B is a block diagram illustrating an exemplary operand cache, according to some embodiments.
Figure 2A:
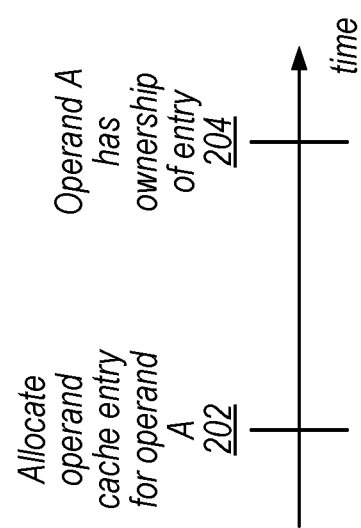
FIG. 2A is a diagram illustrating an exemplary timeline with separation between allocation and ownership of an operand cache entry, according to some embodiments.
Figure 3:
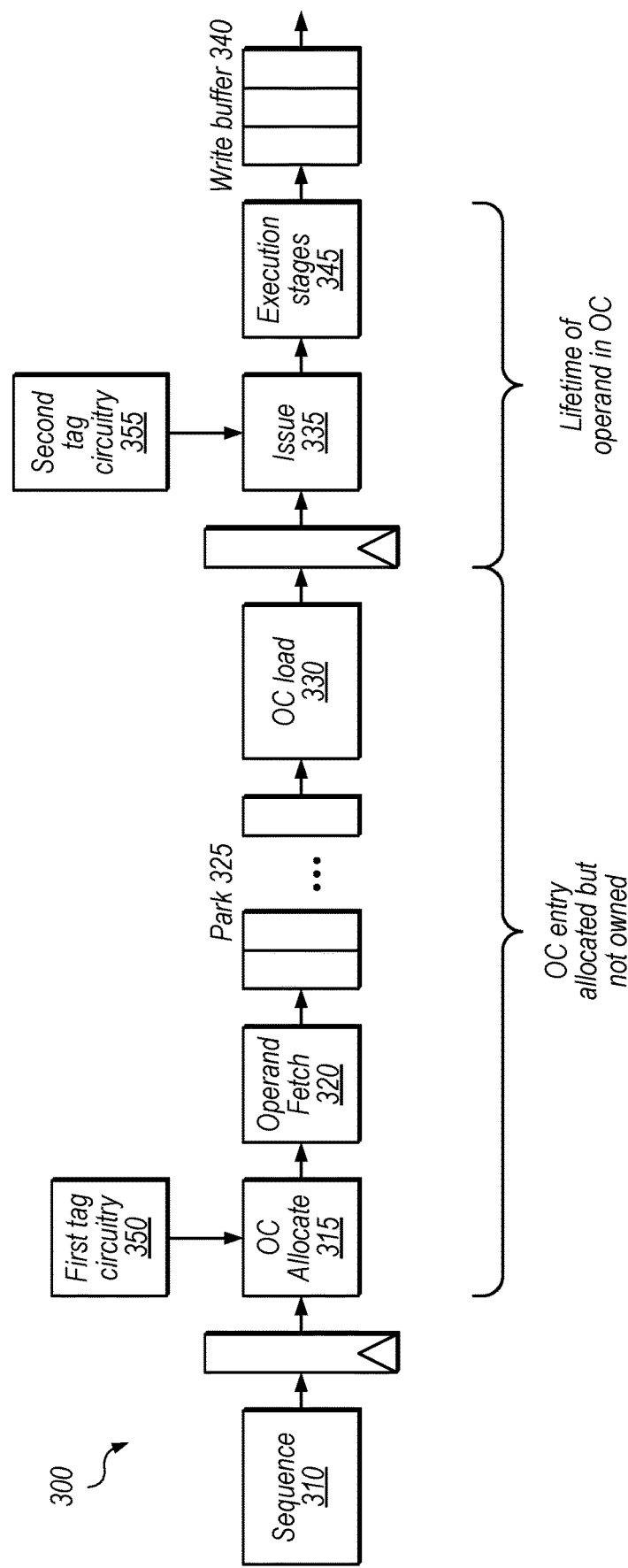
FIG. 3 is a block diagram illustrating an exemplary pipeline, according to some embodiments.
Figure 5:
FIG. 5 is a diagram illustrating exemplary control information maintained for data evicted from an operand cache entry, according to some embodiments.
Figure 6:
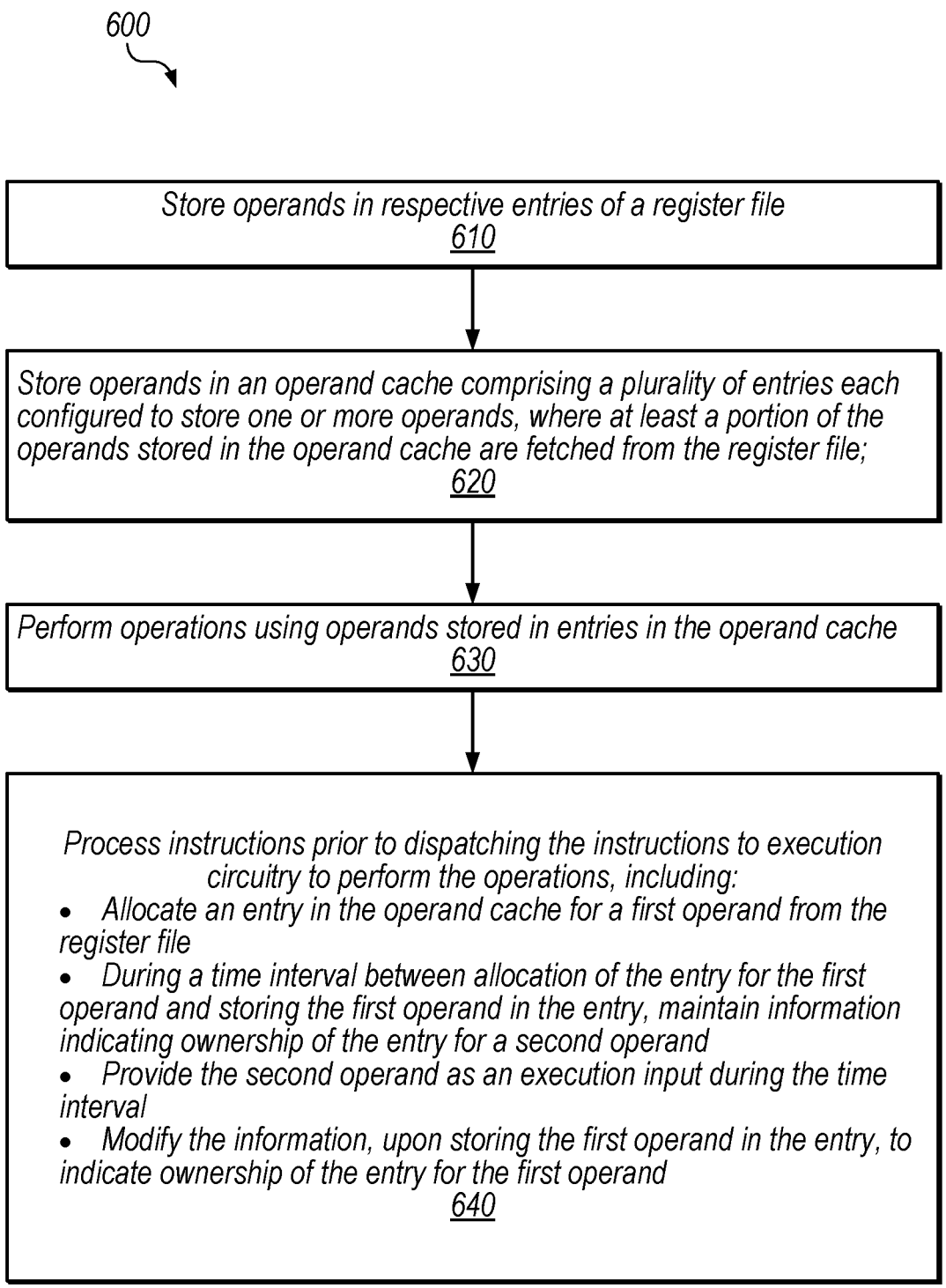
FIG. 6 is a flow diagram illustrating a method for pipelined control of an operand cache entry, according to some embodiments.
Figure 7:
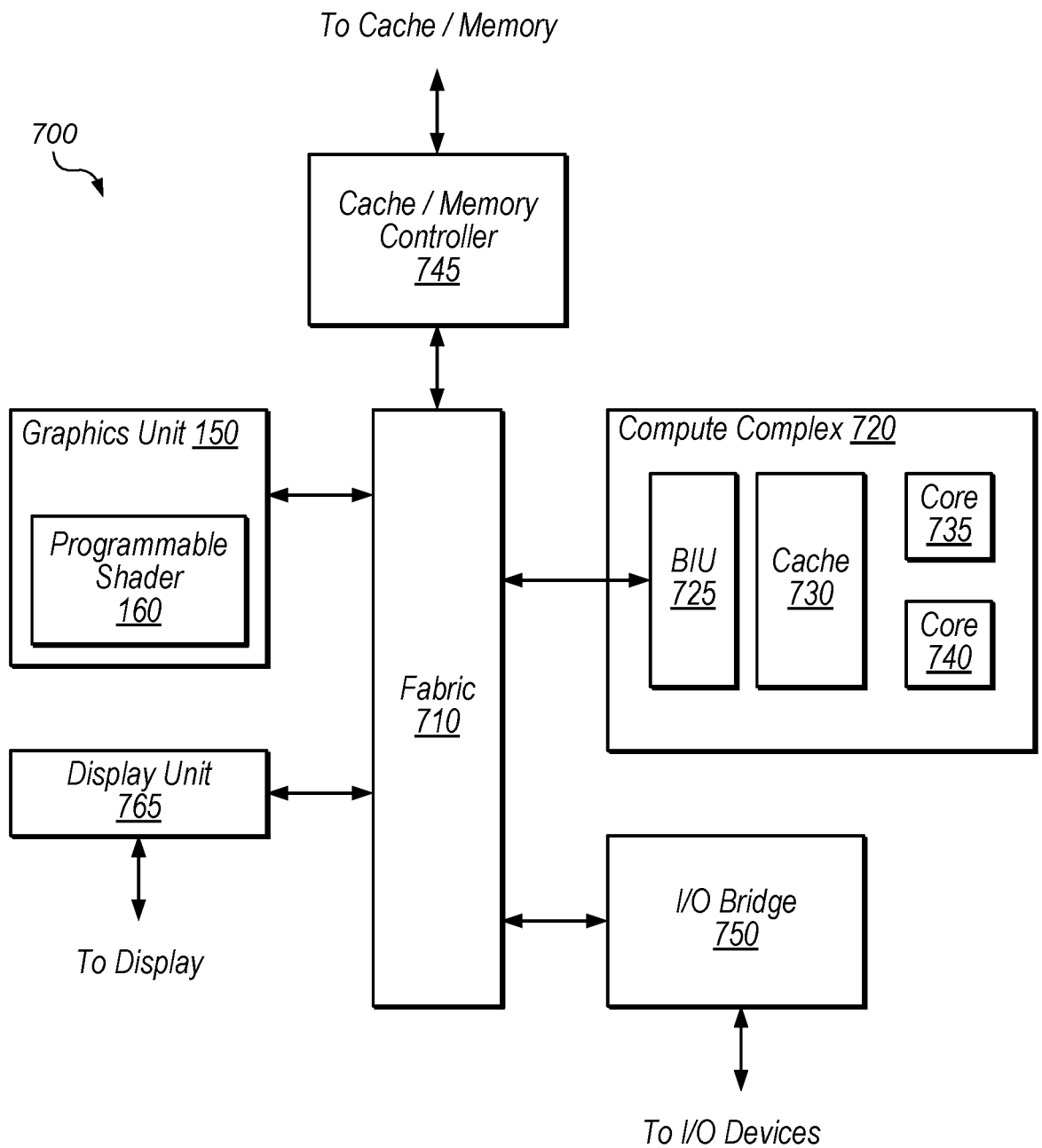
FIG. 7 is a block diagram illustrating one embodiment of a device that includes a graphics unit.
Figure 8:
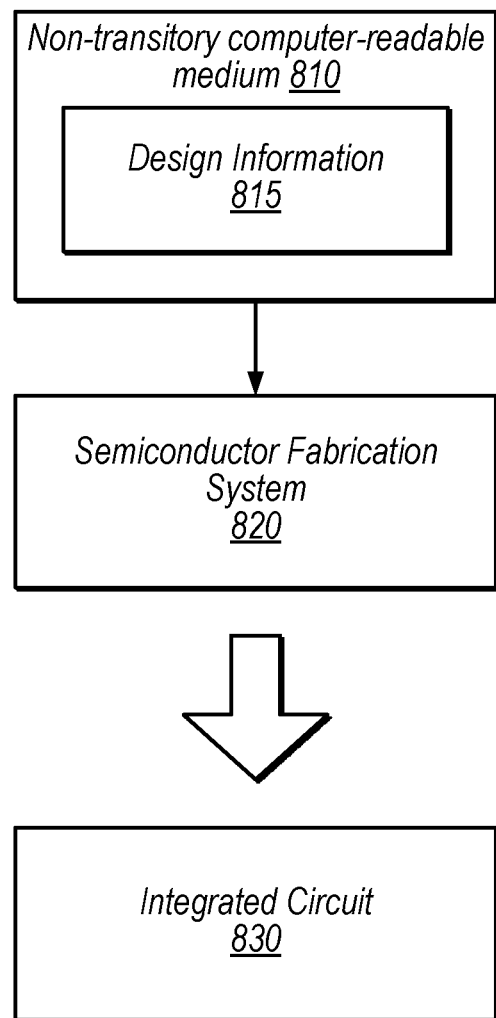
FIG. 8 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2A shows an overview of pipelined operand cache control and FIG. 2B shows exemplary circuitry configured to interface with an operand cache. FIG. 3 shows an exemplary pipeline, FIG. 4 shows exemplary control information maintained for an operand cache entry, including multiple allocation fields for different pipeline stages. FIG. 5 shows exemplary control information maintained for data evicted from the operand cache. FIG. 6 illustrates an exemplary method, FIG. 7 illustrates an exemplary device, and FIG. 8 illustrates an exemplary computer-readable medium. In various embodiments, the disclosed techniques may provide improved performance, reduced chip area, and/or reduced power consumption relative to traditional approaches.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview of Pipelining for Operand Cache

FIG. 2A is a timing diagram illustrating exemplary separation of allocation and ownership of an operand cache entry, according to some embodiments. At point 202, in the illustrated embodiment, a processor allocates an operand cache entry for operand A. At point 204 in the illustrated embodiment, operand A actually obtains ownership of the entry. Note that the entry may be allocated to operand A before the data for operand A has been received. Between point 202 and point 204, another operand may have ownership of the entry and data for the other operand may be read from the entry or written to the entry during this interval. In some embodiments, separate tag information is maintained for different pipeline stages in order to separately track allocation and ownership of operand cache entries.

In various embodiments, separating allocation of an entry from ownership (e.g., in a pipelined fashion, as discussed in further detail below) may improve performance and/or allow use of an operand cache with a relatively smaller number of entries. For example, in implementations in which entries are owned upon allocation, many entries may be allocated but not used while they are waiting for data from the register file. A smaller operand cache may advantageously reduce power consumption and/or improve performance in various ways, e.g., by reducing a number of bits needed for register renaming when reducing operand cache size or using entries more efficiently in an operand cache of a given size, in some embodiments.

Exemplary Operand Cache and Control Circuitry

FIG. 2B is a block diagram illustrating exemplary control of an operand cache, according to some embodiments. In the illustrated embodiment, a device includes control unit 205, operand cache 215, register file 245, and execution circuitry 217.

Control unit 205, in the illustrated embodiment, is configured to control reading from and/or writing to operand cache 215 in various embodiments. Data written to operand cache 215 may include operands from register file 245 and/or operands generated by execution circuitry 217, for example. In some embodiments, control unit is configured to maintain register addresses for operand cache entries, a pending read count for entries, a pending write count for entries, flush indications for entries, etc. Control unit 205 may determine to perform various actions such as allocate, evict, stall while waiting for operand data, etc. based on such information.

In some embodiment, register file 245 is configured to store a plurality of operands for instructions to be executed by execution circuitry 217. Register file 245 may store operands for a large number (e.g., hundreds, thousands) of threads within a GPU in some embodiments. Thus, in the embodiment of FIG. 2, register file 245 may be implemented as a random access memory (RAM) array. Accordingly, in some embodiments, register file 245 is organized as two or more groups of memory banks, where each of the groups includes one or more memory banks that are configured to store operands. Access to register file 245 (e.g., to read an operand from a memory bank) may be slower and power-inefficient, in some embodiments, when compared to other types of structures that are capable of storing operands (e.g., smaller structures that are comprised of flops and/or latches, such as operand cache 215 in some embodiments). Further, bank conflict stalls may occur even in a multi-banked register file, in various embodiments. Note that, although a register file is discussed herein for purposes of explanation, operands may be stored in any of various types of memory or storage elements that store a pool of operands, from which operands may be fetched for storage in an operand cache.

Register file 245 may be a single-instruction, multiple data register file (e.g., a wide SIMD structure that is expensive to access in terms of power consumption) in some embodiments. For example, reading from register file 245 may involve reading multiple operands in one embodiment. Thus, as described below, operand caching may be even more beneficial when register file 245 is a wide SIMD structure, in at least some embodiments.

In various embodiments, register file 245 may receive various data and/or control information from control unit 205, and operands from a memory hierarchy (not explicitly shown). For example, in one embodiment, the memory hierarchy may transmit operands to register file 245, while control unit 205 transmits control information (although various configurations are possible, and control information and/or operands may be transmitted by other structures in some embodiments).

Operand cache 215, in some embodiments, is configured to store one or more operands, and may have improved characteristics relative to register file 245 (e.g., faster access, lower power consumption, no bank conflicts, etc.) in various embodiments. Operands stored by operand cache 215 may, in various embodiments, be a subset of operands that are stored elsewhere, such as register file 245 and/or additional memory hierarchy. Note that as used herein, the term "subset" refers to one or more of something, unless otherwise indicated. Thus, a "subset" of operands indicates one or more operands are being referred to.

In some embodiments, operand cache 215 is smaller in size than register file 245 (and is also smaller than various components of the memory hierarchy). The smaller size of operand cache 215 may also allow operand cache 215 to consume less power than register file 245 when writing and/or reading an operand. Consider one example in which register file 245 is a 4 MB array of RAM, while operand cache 215 has storage for 32 operands. In such a scenario, it may take an appreciably less amount of time and/or power to access the operand cache vs. the register file. In one embodiment, operand cache 215 is configured to store 10% or less of the amount of operands that register file 245 is configured to store (though this percentage is non-limiting and may vary in other embodiments). In general, operand cache 215 may otherwise have one or more of the properties that one of skill in the art would associate with a cache, in various embodiments.

Note that in various embodiments, one or more operands may be stored simultaneously in operand cache 215, register file 245, or another data source (e.g., in the memory hierarchy). That is, there may be two or more copies of an operand in more than one data structure in some embodiments. Various communication protocols such as cache-control protocols may be employed (e.g., via control unit 205) in such embodiments to ensure that multiple copies of operand values are consistent across different storage locations (e.g., by writing back modified data from operand cache 215, keeping track of a current value of a particular operand, etc.).

Execution circuitry 217, in some embodiments, is configured to execute instructions having an operator (e.g., multiply, add, multiply/add, etc.) and various operands. Thus, execution circuitry 217 may receive operands from operand cache 215, register file 245, and/or other data structures and pathways (though operands received from register file 245 may be received more slowly and at a greater power cost, in some embodiments, when compared with operand cache 215). In some embodiments, execution circuitry 217 may be pipelined at various depths. After processing by execution circuitry 217, execution circuitry 217 is configured to send one or more results (i.e., operand results) via one or more data transmission pathways (outputs) (which may be coupled to operand cache 215, register file 245, memory hierarchy, and/or other structures in various embodiments). In some scenarios, one or more operands may be concurrently forwarded from execution circuitry 217 to two or more other structures.

Still referring to the embodiment of FIG. 2B, control unit 205 may transmit and/or receive one or more control signals (that indicate operands to be stored in operand cache 215 or to be provided to execution circuitry 217, for example). Thus, control unit 205 may control reading from and writing to operand cache 215. Control unit 205 may include various circuitry, and be distributed in various components and/or locations in one or more embodiments (e.g., a portion of control unit 205 may be located within operand cache 215, a decode unit, attached to one or more control signal or data pathways, etc.). All or a portion of control unit 205 may be located in operand cache 215, an execution pipeline of system 200, or any other element of system 200 that may be configured to communicate control signal(s) (such as an instruction decode unit), in one or more embodiments. Speaking generally, the locations of various elements discussed herein are not limited to the location(s) shown.

In some embodiments, separating operand cache allocation and ownership may improve utilization of operand cache 215, e.g., by reducing time waiting for operands from register file 245 before issuing corresponding operations for execution.

Example Pipeline

FIG. 3 is a block diagram illustrating an exemplary pipeline 300 that implements separate allocation and ownership of operand cache entries, according to some embodiments. In some embodiments, pipeline 300 is included in programmable shader 160. In some embodiments, pipeline 300 is one of multiple pipelines that send instructions for execution by various data path blocks. In the illustrated embodiment, pipeline 300 includes sequence stage 310, operand cache (OC) allocate stage 315, operand fetch stage 320, park stage 325, operand cache load stage 330, issue stage 335, execution stages 345, and write buffer 340. In the illustrated embodiment, the apparatus also includes first tag circuitry 350 and second tag circuitry 355. Note that the various stages are shown for purposes of explanation, but pipelines with any of various appropriate stages and organization of stages may be implemented in other embodiments.

Sequence stage 310, in some embodiments, is configured to retrieve instructions from an instruction cache. In some embodiments, thread group manager circuitry (not shown) indicates the location of a first instruction for a stream of instructions to be executed. In some embodiments, sequence unit 310 is configured to send instructions down the pipeline until a stream break occurs, at which point stage 310 may label the last instruction and begin a new stream (e.g., for a new set of fragment quads that share control information and execution state, which may be referred to as a "clique," "warp," or "wavefront"). Stage 310 may decode instructions, e.g., to determine a specified operation, operand locations, etc.

OC allocation stage 315, in some embodiments, is configured to receive decoded instruction and allocate OC entries for instruction operands. In the illustrated embodiment, first tag circuitry 350 is accessible to allocation stage 315 (and potentially other stages) and indicates the status of the operand cache for allocation purposes. Specific examples of such control information are discussed below with reference to FIG. 4. Note that, in the illustrated embodiment, separate tag information is maintained at stage 315 for allocation and at a later stage (e.g., issue stage 335) for ownership.

Operand fetch stage 320, in some embodiments, is configured to retrieve operands, e.g., for misses in the operand cache 215 for which new entries are allocated. Once operands are fetched, they are stored in a park stage 325, in the illustrated embodiment, which may be a first in first out (FIFO) data structure. In some embodiments, the park stage 325 holds instructions and their associated execution state, including instructions that do not have ownership of a needed operand cache entry.

OC load stage 330, in some embodiments, is configured to load fetched values into the operand cache. In some embodiments, at the end of OC load stage 330, control unit 205 is configured to alter tag information in second tag circuitry 355 to indicate that operands now have ownership of their corresponding entries.

Thus, as shown in the illustrated example, OC entries are allocated but not owned in stages 315-330 and the lifetime of an operand ownership of an operand cache entry may cover issue stage 335 and multiple execution stages 345 (note that the lifetime may extend further than shown in FIG. 3, e.g., if the operand remains in the operand cache for subsequent instructions rather than being evicted after it is used).

Issue stage 335, in some embodiments, includes scoreboard circuitry configured to track outstanding operations for the execution pipelines it controls, e.g., to allow out-of-order execution without violating data dependencies. In the illustrated embodiment, issue stage 335 is configured to issue operations for performance by one or more execution units, e.g., that include execution stages 354. In the illustrated embodiment, issue stage 335 is configured to access second tag circuitry 355 to determine ownership of operand cache entries. In some embodiments, control unit 205 is configured to modify second tag circuitry 355 in conjunction with loading operand cache entries at the end of OC load stage 330.

Execution stages 345, in the illustrated embodiment, are configured to produce instruction results. In some embodiments, execution stages 345 are implemented by execution circuitry 217. In various embodiments, result operands may have entries allocated in the operand cache at stage 315 or may be stored in the register file, or both. In some embodiments, different instructions may have different numbers of execution cycles. In some embodiments, execution stages 345 are configured to perform SIMD graphics operations.

Write buffer 340, in some embodiments, is configured to store data flushed from the operand cache until it has been written to the register file. In some embodiments, write buffer 340 may cover delays due to port arbitration, for example. In some embodiments, the device is configured to maintain a structure for evicted data in-flight (EDIF) tags (discussed in further detail below) and write buffer 340 is configured to store state and data for EDIF operations that are marked for forwarding to a subsequent instruction until the subsequent instruction reaches OC load stage 330.

The EDIF circuitry may handle situations where an operand is evicted from the operand cache, but a subsequent instruction uses the operand before its data is available in the register file. Because of the pipelined techniques discussed herein, there may be a time interval between evicting an operand cache entry and writing its data to a register. The EDIF tag buffer may be an in-order FIFO that tracks evicted values between OC eviction and writes to the register file. Further, in some embodiments, EDIF data may be forwarded to the subsequent instruction before (or without) storing the data in the register file. Example EDIF control information is discussed below with reference to FIG. 5.

Example Operand Cache Control Information

FIG. 4 is a diagram illustrating exemplary operand cache control information, according to some embodiments. In some embodiments, the disclosed fields are maintained for each operand cache entry. Note that some of the fields may be maintained at different pipeline stages. In the illustrated embodiment, the control information 400 includes a valid field 410, a thread state field 415, an allocation tag 420, a hint field 425, a cycles field 430, an ownership tag 440, and a last use field 450.

Valid field 410, in some embodiments, indicates whether at least a portion of the data in an operand cache entry is valid. In some embodiments, valid field 410 is a single bit. In some embodiments, the valid field indicates that an entry has been allocated and not yet invalidated. In some embodiments, hits may be generated only for valid entries.

Thread state field 415, in some embodiments, indicates the state of the entry for each of multiple threads (e.g., in a clique or wavefront). For example, in some embodiments, field 415 indicates, for each of the threads, whether the entry is invalid, clean, dirty, or pending dirty. Note that a portion of an operand cache entry may be indicated as invalid even when the valid field 410 indicates that at least a portion of the entry is valid (e.g., due to predicated execution that causes differences among threads that use the entry). In some embodiments, the dirty state indicates that the data in the entry has changed relative to the register file. In some embodiments, the pending dirty state is based on speculative execution and indicates that the entry may contain dirty data if the speculative execution is actually committed.

Allocation tag 420, in some embodiments, indicates the operand for which the entry is allocated by control unit 205. Tags discussed herein may include various different forms of operand identifying information, in various embodiments. As one example, a tag may include a clique or wavefront identifier and a register address for the operand. In some embodiments, control unit 205 uses the allocation tag 420 to detect cache hits and determine which operands to evict from the operand cache. Thus, in various embodiments, the allocation tag does not indicate which operand is actually stored in an entry and owns the entry. In some embodiments, allocation tag 420 is maintained by first tag circuitry 350 of FIG. 3.

Hint field 425, in some embodiments, indicates whether an operand should be cached. In some embodiments, all operands are cached in an operand cache, but control unit 205 may not retain these entries in the cache if the hint field indicates they will not be used again. Hint field 425 may be populated based on information from a compiler, for example.

Cycles field 430, in some embodiments, indicates the number of cycles that a corresponding instruction for a given operand will take to execute. Control unit 205 may use this information when selecting among multiple entries for eviction. For example, control unit 205 may determine to select an entry for eviction when the corresponding instruction will take a lesser number of cycles, relative to another candidate entry for eviction, to reduce stall cycles at OC load stage 330. The cycles field 430 may indicate the total number of cycles for the instruction or the remaining cycles for the instruction (e.g., using a counter). In some embodiments, an additional number of cycles may be added to the cycle count for dirty entries, e.g., to approximate the time needed to flush dirty data.

Ownership tag 440, in some embodiments, indicates the current owner of an operand cache entry. In some embodiments, this tag is maintained at a later stage than allocation tag 420 (note that versions of various different types of control information may be maintained at multiple stages, but these copies are not explicitly shown to simplify explanation). In some embodiments, control unit 205 is configured to update ownership tag 440 when a corresponding operand's data is actually loaded in the entry by OC load stage 330. In some embodiments, ownership tag 440 is maintained by second tag circuitry 355 of FIG. 3.

Last use field 450, in some embodiments, is used to indicate (e.g., based on information from a compiler) that a particular instruction is the last use of an operand. In some embodiments, this information may be used as another parameter in selecting entries for eviction, with entries that are a last use being preferred for invalidation/eviction.

In some embodiments, if no invalid OC entries are available for a new operand, control unit 205 is configured to select an operand according to the following priority order (1) invalid, non-cached clean entries with 0 cycle count or non-cached dirty entries with 0 cycle count (these entries will not be reused and will not cause stalls), (2) cached, clean entries, non-cached clean entries with non-0 cycle counts, and non-cached dirty entries with non-0 cycle counts, and (3) cached, dirty entries. In some embodiments, cached or non-cached status may be based on the hint information discussed above and control unit 205 may also invalidate entries for which a last-use indication is received.

Example Evicted Data in Flight Information

FIG. 5 is a diagram illustrating example control information for evicted data in flight, according to some embodiments. In some embodiments, the illustrated control information 500 is maintained for each entry in write buffer 340 that was evicted from the operand cache 215. In the illustrated embodiment, the information includes thread state 510, tag 520, origin operand cache address 530, forward field 540, and forward address 550.

Thread state 510, and tag 520 in some embodiments, include information similar to that discussed above with reference to thread state 415 and tags 420/440. In some embodiments, the allocation stage is configured to examine both the allocation tags 420 and the EDIF tags 520 when determining whether there is a hit. In some embodiments, control unit 205 is configured to search the EDIF tags only if there is not a hit in the operand cache 215. When there is a hit to the EDIF, the allocation stage 315 may allocate a new entry for the EDIF data rather than waiting for the data to be stored in the register file.

Forward field 540, in some embodiments, indicates whether a subsequent instruction has identified this entry as a match (e.g., in its allocation stage). In some embodiments, when this is the case, the device is configured not to write the data from write buffer 240 to the register file, but rather is configured to transfer the data to the operand cache entry indicated by the forward address 550 when the subsequent instruction reaches the OC load stage 330.

Origin operand cache address 530, in some embodiments, indicates that OC entry from which the data was evicted. In some embodiments, this field is used to identify entries when forwarding is desired. For example, in embodiments with register renaming (e.g., to operand cache addresses), the issue logic may need to know which operand cache entry to forward. In some embodiments, the origin operand cache address 530 is sent down the pipeline to the issue logic to identify the correct operand cache entry to forward.

In some embodiments, the device is configured to select between forwarding a result from the EDIF or stalling until the EDIF data is written to the register file before proceeding with the subsequent instruction. In some embodiments, this is implemented by only allowing the forward field 540 to be set for a set of N youngest members of the EDIF and stalling for older members, where N is an integer greater than zero.

In various embodiments, the EDIF may improve performance in certain situations by avoiding accessing the register file for an unexpected subsequent access to an operand cache entry after eviction of the entry.

Example Method

FIG. 6 is a flow diagram illustrating an exemplary method 600 for pipelined control of an operand cache, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., graphics unit 150) stores operands in respective entries of a register file. Each entry may store one or more operands.

At 620, in the illustrated embodiment, the device stores operands in an operand cache comprising a plurality of entries each configured to store one or more operands, where at least a portion of the operands stored in the operand cache are fetched from the register file. Note that other register file entries may be results operands that are generated by execution circuitry rather than retrieved from the register file.

At 630, in the illustrated embodiment, execution circuitry of the device performs operations using operands stored in entries in the operand cache. For example, arithmetic logic units may perform arithmetic or bitwise operations using operands from the operand cache as inputs. Operands may also be used for addressing or stored as results, for example.

At 640, in the illustrated embodiment, the device uses a pipeline to process instructions prior to dispatching the instructions to execution circuitry to perform the operations. In this illustrated embodiment, the processing includes allocating an entry in the operand cache for a first operand from the register file (e.g., using first tag circuitry 350). In the illustrated embodiment, during a time interval between allocation of the entry for the first operand and storing the first operand in the entry, the device maintains information (e.g., in second tag circuitry 355) indicating ownership of the entry for a second operand. In the illustrated embodiment, the device provides the second operand as an execution input during the time interval. Generally, the second operand may be retrieved and/or modified multiple times while it owns an operand cache entry, even if the entry has been allocated to the first operand. In the illustrated embodiment, the device is configured to modify the information, upon storing the first operand in the entry, to indicate ownership of the entry for the first operand. For example, the device may modify the information in second tag circuitry 355 in conjunction with OC load stage 330 storing the data for the first operand in the operand cache.

Exemplary Device

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 8 is a block diagram illustrating an exemplary non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabrication at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 2B, and/or 3. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a register file configured to store operands;
 an operand cache comprising a plurality of entries each configured to store one or more operands, wherein the apparatus is configured to fetch input operands from the register file for storage in the operand cache;
 execution circuitry configured to perform operations on operands stored in entries in the operand cache; and
 pipeline circuitry configured to process instructions for execution, including:
  first tag circuitry configured to indicate allocation of an entry for a first operand; and
  second tag circuitry configured to indicate ownership of the entry for the first operand;
  wherein, during a time interval between allocation and ownership of the entry for the first operand, the apparatus is configured to provide a second operand from the entry as an execution input to the execution circuitry.

2. The apparatus of claim 1, wherein the apparatus is configured to use the first tag circuitry to determine:
whether operands are hit in the operand cache; and
which entry to evict from the operand cache.

3. The apparatus of claim 1, wherein the apparatus is configured to use the second tag circuitry when reading data from the operand cache.

4. The apparatus of claim 1, further comprising:
one or more storage elements configured to store operand data in order for operands evicted from the operand cache until the evicted operand data is written to the register file.

5. The apparatus of claim 4, wherein the one or more storage elements are configured to forward data to the operand cache in response to a hit for a corresponding operand stored in the one or more storage elements.

6. The apparatus of claim 1, wherein the apparatus is configured to fetch data for the first operand from the register file after allocation of the entry for the first operand and prior to ownership of the entry for the first operand.

7. The apparatus of claim 1, wherein tag data for a given entry in the operand cache includes a register address and an identifier of a group of commonly-controlled threads that specify the register address.

8. A method, comprising:
storing operands in respective entries of a register file;
storing operands in an operand cache comprising a plurality of entries each configured to store one or more operands, wherein at least a portion of the operands stored in the operand cache are fetched from the register file;
performing, by execution circuitry, operations using operands stored in entries in the operand cache; and
processing instructions prior to dispatching the instructions to the execution circuitry, including:
allocating an entry in the operand cache for a first operand from the register file;
during a time interval between allocation of the entry for the first operand and storing the first operand in the entry, maintaining information indicating ownership of the entry for a second operand;
providing the second operand as an execution input during the time interval; and
modifying the information, upon storing the first operand in the entry, to indicate ownership of the entry for the first operand.

9. The method of claim 8, further comprising using first tag information indicating allocation of the operand to determine whether operands are hit in the operand cache and which entry to evict from the operand cache.

10. The method of claim 8, further comprising using second tag information indicating ownership of the entry for the first operand to access the first operand for transmittal to the execution circuitry.

11. The method of claim 8, further comprising storing operand data in order in one or more storage elements, for operands evicted from the operand cache, until the evicted operand data is written to the register file.

12. The method of claim 11, further comprising forwarding data to the operand cache in response to a hit for a corresponding operand stored in the one or more storage elements.

13. The method of claim 8, further comprising fetching data for the first operand from the register file after allocation of the entry for the first operand and prior to ownership of the entry for the first operand.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:
a register file configured to store operands;
an operand cache comprising a plurality of entries each configured to store one or more operands, wherein the circuit is configured to fetch input operands from the register file for storage in the operand cache;
execution circuitry configured to perform operations on operands stored in entries in the operand cache; and
pipeline circuitry configured to process instructions for execution, including:
first tag circuitry configured to indicate allocation of an entry for a first operand; and
second tag circuitry configured to indicate ownership of the entry for the first operand;
wherein, during a time interval between allocation and ownership of the entry for the first operand, the circuit is configured to provide a second operand from the entry as an execution input to the execution circuitry.

15. The non-transitory computer readable storage medium of claim 14, wherein the circuit is configured to use the first tag circuitry to determine:
whether operands are hit in the operand cache; and
which entry to evict from the operand cache.

16. The non-transitory computer readable storage medium of claim 14, wherein the circuit is configured to use the second tag circuitry when reading data from the operand cache.

17. The non-transitory computer readable storage medium of claim 14, wherein the circuit further includes:
one or more storage elements configured to store operand data in order for operands evicted from the operand cache until the evicted operand data is written to the register file.

18. The non-transitory computer readable storage medium of claim 17, wherein the one or more storage elements are configured to forward data to the operand cache in response to a hit for a corresponding operand stored in the one or more storage elements.

19. The non-transitory computer readable storage medium of claim 14, wherein the circuit is configured to fetch data for the first operand from the register file after allocation of the entry for the first operand and prior to ownership of the entry for the first operand.

20. The non-transitory computer readable storage medium of claim 14, wherein tag data for a given entry in the operand cache includes a register address and an identifier of a group of commonly-controlled threads that specify the register address.

* * * * *